US012783995B2

(12) United States Patent
Vinsensius et al.

(10) Patent No.: US 12,783,995 B2
(45) Date of Patent: Nov. 3, 2026

(54) COMMUNICATIONS SERVER APPARATUS, METHOD AND COMMUNICATIONS SYSTEM FOR MANAGING ORDERS

(71) Applicant: GRABTAXI HOLDINGS PTE. LTD., Singapore (SG)

(72) Inventors: Albert Vinsensius, Singapore (SG); Yong Liu, Singapore (SG); Kaican Kang, Singapore (SG)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 101 days.

(21) Appl. No.: 18/691,604

(22) PCT Filed: Jul. 28, 2022

(86) PCT No.: PCT/SG2022/050539
§ 371 (c)(1),
(2) Date: Mar. 13, 2024

(87) PCT Pub. No.: WO2023/063875
PCT Pub. Date: Apr. 20, 2023

(65) Prior Publication Data
US 2024/0412160 A1 Dec. 12, 2024

(30) Foreign Application Priority Data
Oct. 13, 2021 (SG) ............................ 10202111368P

(51) Int. Cl.
*G06Q 10/087* (2023.01)
*G06Q 10/083* (2024.01)

(52) U.S. Cl.
CPC ......... *G06Q 10/087* (2013.01); *G06Q 10/083* (2013.01)

(58) Field of Classification Search
CPC ........................... G06Q 10/087; G06Q 10/083
See application file for complete search history.

(56) References Cited

U.S. PATENT DOCUMENTS 10,467,579 B1 * 11/2019 Reiss ..................... G06Q 50/40
10,789,558 B2 * 9/2020 Waldeck .......... G06Q 10/06315
(Continued)

FOREIGN PATENT DOCUMENTS

| | | | |
|---|---|---|---|
| CN | 110097303 | A | 8/2019 |
| CN | 111832850 | A | 10/2020 |
| WO | 2020130931 | A1 | 6/2020 |

OTHER PUBLICATIONS

International Search Report and Written Opinion dated Mar. 13, 2023 which was issued in connection with PCT Application No. PCT/SG2022/050539.

(Continued)

*Primary Examiner* — Garcia Ade
(74) *Attorney, Agent, or Firm* — Maschoff Brennan

(57) ABSTRACT

A communications server apparatus for managing orders which, in response to receiving order data indicative of a scheduled order associated with a user, the order data including an item data field indicative of at least one item and a time data field indicative of a delivery time defined by the user for delivery of the scheduled order to the user, and in a batching cycle, generate, in one or more data records, batch data indicative of an order batch including the scheduled order and at least one unbatched order, quality data indicative of a quality indicator for the order batch, and if a batching efficiency condition is satisfied based on the quality indicator, release data indicative of a release of the order batch for allocation of the order batch to a delivery agent for the scheduled order to be delivered by the agent to the user at the delivery time.

22 Claims, 10 Drawing Sheets

(56) References Cited

U.S. PATENT DOCUMENTS

| | | | | |
|---|---|---|---|---|
| 11,372,426 | B2 * | 6/2022 | Shih | B60R 25/24 |
| 11,783,403 | B2 * | 10/2023 | Rajkhowa | G06F 16/29<br>705/26.81 |
| 2018/0240045 | A1 | 8/2018 | Zhang et al. | |
| 2019/0132702 | A1 | 5/2019 | Ehsani et al. | |
| 2020/0342517 | A1 | 10/2020 | Rajkhowa et al. | |
| 2025/0371490 | A1 * | 12/2025 | Zhang | G06Q 10/0832 |

OTHER PUBLICATIONS

Shenggong Ji et al.: Alleviating Users' Pain of Waiting: Effective Task Grouping for Online-to-Offline Food Delivery Services, the Creative Commons Attribution 4.0 International May 2019.

Manas Joshi et al.: Batching and Matching for Food Delivery in Dynamic Road Networks, Aug. 29, 2020.

Kuhn et al.: Integrated order batching and vehicle routing operations in grocery retail—A General Adaptive Large Neighborhood Search algorithm, European Journal of Operational Research vol. 294, Issue 3, Nov. 1, 2021, pp. 1003-1021.

Delalić et. al.: The Order Batching Concept Implemented In Real Smart Warehouse

* cited by examiner

COMMUNICATIONS SERVER APPARATUS, METHOD AND COMMUNICATIONS SYSTEM FOR MANAGING ORDERS

This application is a U.S. National Stage Application pursuant to 35 USC Section 371 claiming benefit of and priority to International Application No. PCT/SG2022/050539, filed on Jul. 28, 2022, and further claiming priority to Singapore application Ser. No. 10202111368P filed on Oct. 13, 2021, each of which are hereby incorporated by reference in their entirety.

TECHNICAL FIELD

The invention relates generally to the field of communications. One aspect of the invention relates to a communications server apparatus for managing orders. Other aspects of the invention relate to a method for managing orders, and a communications system for managing orders.

One aspect of the invention has particular, but not exclusive, application to managing orders, which includes batching a scheduled order and at least one unbatched order, into an order batch to enhance efficiency in the management and delivery of the order batch having the scheduled order.

BACKGROUND

In food deliveries, consumers often want to place orders in advance and schedule their food delivery time to correspond with their desired meal times. Such orders are referred to as "scheduled orders", as opposed to "instant orders" which are to be fulfilled immediately and delivered as soon as possible after the instant orders are placed. One solution which is currently used to handle such scheduled orders is to delay their processing such that the expected delivery time is within the desired delivery time window. This way, the scheduled order is treated as if it is an instant order after a predetermined time delay.

FIG. 7 shows diagrams providing a comparison between the processing handling for instant 790*a* and scheduled 790*b* orders according to the prior art. FIG. 7 illustrates handling a scheduled order as an instant order. For the scheduled order 790*b*, processing of the order 790*b* is delayed from the time the order 790*b* was created until a time that the processing of the order 790*b* is to begin such that the scheduled order 790*b* is effectively processed according to the timeline of the instant order 790*a*. The downside of such an approach is that the fact that a scheduled order 790*b* is placed in advance and the order information is available much earlier than an instant order 790*a* is not being made use of-instead, scheduled orders 790*b* are being treated the same as any other instant orders 790*a* eventually.

Other existing implementations focus just on handling scheduled orders by ensuring they are delivered within the desired delivery window. For example, a known technique demonstrates a system and method for scheduled delivery of shipments with multiple shipment carriers, while another known technique has another approach for allowing customers to select partial time windows.

A further known technique, while providing a real-time pooling methodology combining order bundling, in-transit pooling and new-order pooling to handle dynamically arriving orders, fails to provide for handling scheduled orders. For example, the described order bundling only considers batching based on consumer-selected pick-up and delivery locations. Importantly, the approach in the known technique suffers from the downside mentioned above as it would treat scheduled orders as if they are instant orders.

SUMMARY

Aspects of the invention are as set out in the independent claims. Some optional features are defined in the dependent claims.

Implementation of the techniques disclosed herein may provide significant technical advantages. Techniques disclosed herein provide for batching of orders. Orders, including at least one scheduled order with a user-defined delivery time, are batched into an order batch. The order batch may then be determined in terms of efficiency.

If the order batch is determined to meet the efficiency condition, the order batch is released for dispatch and allocation to a delivery agent for delivery, where the scheduled order is subsequently delivered within the user-defined delivery time. In the techniques disclosed herein, a scheduled order is processed in advance of its corresponding user-defined delivery time, making use of the time between the creation of the scheduled order and the allocation of the scheduled order for delivery, to batch the scheduled order (and at least one other unbatched order) into an order batch that meets the batching efficiency condition. The scheduled order may undergo one or more batching cycles until the efficiency condition is satisfied. In contrast, in known approaches, processing of scheduled orders is delayed until the scheduled orders are effectively treated or processed as instant orders.

Allowing the scheduled orders to undergo one or more batching cycles in advance of the user-defined delivery times, and dispatch and allocation of the scheduled orders (as part of one or more order batches) if the efficiency condition is satisfied may allow a more efficient use of resources in processing the various orders, including scheduled orders, and batching orders together. By batching orders together, efficiency may be enhanced by enabling a more efficient use of computing resources and processing (or computational) load to process the orders together as an order batch, and subsequent allocation of the order batch to a (one) delivery partner to deliver the orders in the order batch. For example, data relating to orders contained in the order batch may be processed more efficiently together, and related data just need to be transmitted to one delivery agent, which may further help to minimise use of data and network bandwidth. If orders are not batched together but rather released as individual orders for dispatch and allocation, and ultimately delivery, by multiple or different delivery partners, a higher use of computing resources and processing load is expected to process these orders separately, and higher data bandwidth and network traffic are required for transmission of related data to multiple communications devices.

Further, by batching the orders, including at least one scheduled order together with at least one other unbatched order, a more efficient use of transport resources may be achieved as the order batch can be assigned to one delivery agent for delivery of the orders using one transport vehicle, in contrast to having to require multiple delivery agents using multiple transport vehicles to deliver the separate multiple orders without batching.

Further, by processing scheduled orders in advance of the user-defined delivery times and ensuring that the order batch meets the efficiency condition before release of the order batch for dispatch and allocation, efficiency in computing resources and/or transport resources may be further enhanced. For example, by enabling earlier processing, a scheduled order may potentially be batched together with an existing unbatched order placed by another user, where both orders are to be delivered to respective locations within the same geographical area. Batching the orders together for delivery by one delivery agent to the same geographical area results in greater efficiency and savings, for example, in terms of cost, distance and time. In such a case, the efficiency condition is likely to be met and the batched orders can be released for allocation to the delivery agent. The delivery agent can then proceed to the geographical area to deliver the two orders to the respective locations that are close to each other, thereby saving cost, time, and transport fuel, leading to a more effective use of resources.

In contrast, if the same scheduled order has not been considered for batching in advance but is to be treated as an instant order, as in known approaches, the same unbatched order may be released earlier for allocation and delivery before the scheduled order is processed and more resources would have to be expended to deliver both orders. First, more computing resources would be needed to process the scheduled order and the unbatched order separately at different times, rather than at the same time if they have been batched together. Therefore, the techniques disclosed herein provide for lower computational burden. Second, more transport resources would be needed to deliver the scheduled order and the unbatched order at different times and by different delivery agents to the same geographical area, rather than at the same time by one delivery agent if they have been batched together. Moreover, by batching orders together according to the techniques disclosed herein, vehicles used for deliveries will require less maintenance and will experience less wear and tear for delivering the same amount of orders, since the efficiency is increased.

With the reduction in use of transportation resources (e.g., less number of delivery trips), the techniques disclosed herein also provide for a reduction in pollution and greenhouse gas emission, leading to enhanced environmental sustainability and health benefits.

In an exemplary implementation, the functionality of the techniques disclosed herein may be implemented in software running on a handheld communications device, such as a mobile phone. The software which implements the functionality of the techniques disclosed herein may be contained in an "app"—a computer program, or computer program product—which the user has downloaded from an online store. When running on the, for example, user's mobile telephone, the hardware features of the mobile telephone may be used to implement the functionality described below, such as using the mobile telephone's transceiver components to establish the secure communications channel for managing orders.

BRIEF DESCRIPTION OF THE DRAWINGS

The invention will now be described, by way of example only, and with reference to the accompanying drawings in which.

DETAILED DESCRIPTION

Various embodiments may relate to scheduled order batching, for example, for food scheduled order batching, or scheduled order batching for food or perishable items.

The techniques disclosed herein may enable handling scheduled orders by ensuring they are delivered within the desired delivery window, while integrating an order batching decision. Order batching aims to group multiple orders to be fulfilled and delivered by a (single) delivery partner, to improve delivery efficiencies (e.g., number of orders fulfilled per unit time). The techniques disclosed herein may enable the batching decision to be explicitly decided on as orders are received.

The techniques disclosed herein may provide one or more approaches to handle scheduled orders with respect to order batching, which exploits the fact that a scheduled order is placed in advance, to improve batching efficiency, while ensuring these scheduled orders are delivered within the desired delivery time window(s).

The techniques disclosed herein are provided to address the limitation of known techniques that treat scheduled orders as if they are instant orders.

As compared to known techniques which delay processing of scheduled orders, thereby losing the opportunity to consider these scheduled orders for batching earlier, in the techniques disclosed herein, having a longer time to consider an order to be batched may often lead to a higher quantity and quality of batched orders, which may result in higher cost savings and network efficiency as more orders may be fulfilled with the same number of driver partners available.

Further, as compared to known techniques which only consider batching based on consumer-selected pick-up and delivery locations, the techniques disclosed herein may, additionally or alternatively, take into consideration consumer-selected temporal information such as pick-up time window and/or delivery time window.

Figure 1:
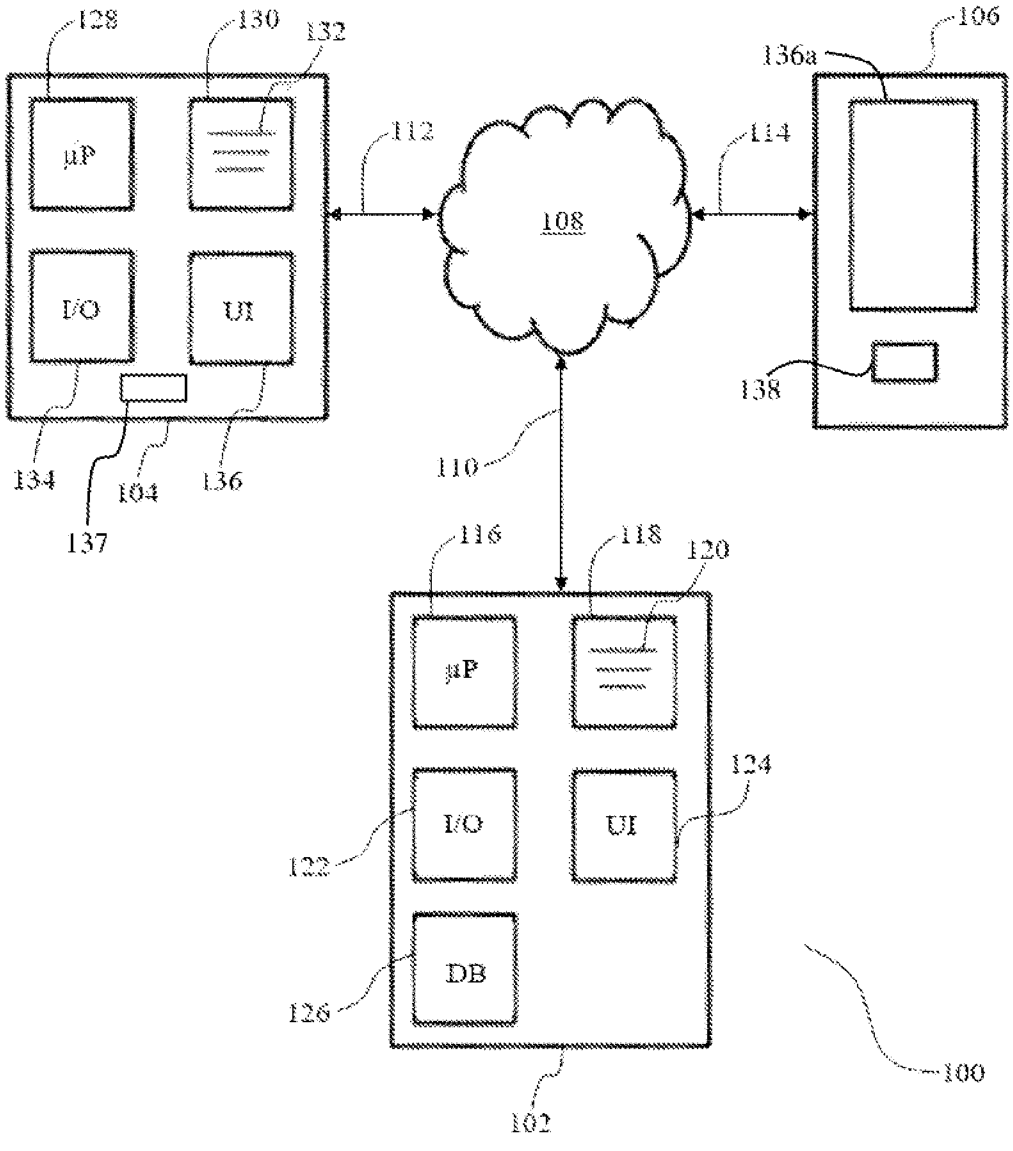
FIG. 1 is a schematic block diagram illustrating an exemplary communications system involving a communications server apparatus.

Referring first to FIG. 1, a communications system 100 is illustrated, which may be applicable in various embodiments. The communications system 100 may be for managing orders.

The communications system 100 includes a communications server apparatus 102, a first user (or client) communications device 104 and a second user (or client) communications device 106. These devices 102, 104, 106 are connected in or to the communications network 108 (for example, the Internet) through respective communications links 110, 112, 114 implementing, for example, internet communications protocols. The communications devices 104, 106 may be able to communicate through other communications networks, such as public switched telephone networks (PSTN networks), including mobile cellular communications networks, but these are omitted from FIG. 1 for the sake of clarity. It should be appreciated that there may be one or more other communications devices similar to the devices 104, 106.

The communications server apparatus 102 may be a single server as illustrated schematically in FIG. 1, or have the functionality performed by the communications server apparatus 102 distributed across multiple server components. In the example of FIG. 1, the communications server apparatus 102 may include a number of individual components including, but not limited to, one or more microprocessors (μP) 116, a memory 118 (e.g., a volatile memory such as a RAM (random access memory)) for the loading of executable instructions 120, the executable instructions 120 defining the functionality the server apparatus 102 carries out under control of the processor 116. The communications server apparatus 102 may also include an input/output (I/O) module (which may be or include a transmitter module and/or a receiver module) 122 allowing the server apparatus 102 to communicate over the communications network 108. User interface (UI) 124 is provided for user control and may include, for example, one or more computing peripheral devices such as display monitors, computer keyboards and the like. The communications server apparatus 102 may also include a database (DB) 126, the purpose of which will become readily apparent from the following discussion.

The communications server apparatus 102 may be for managing orders.

The user communications device 104 may include a number of individual components including, but not limited to, one or more microprocessors (μP) 128, a memory 130 (e.g., a volatile memory such as a RAM) for the loading of executable instructions 132, the executable instructions 132 defining the functionality the user communications device 104 carries out under control of the processor 128. User communications device 104 also includes an input/output (I/O) module (which may be or include a transmitter module and/or a receiver module) 134 allowing the user communications device 104 to communicate over the communications network 108. A user interface (UI) 136 is provided for user control. If the user communications device 104 is, say, a smart phone or tablet device, the user interface 136 may have a touch panel display as is prevalent in many smart phone and other handheld devices. Alternatively, if the user communications device 104 is, say, a desktop or laptop computer, the user interface may have, for example, one or more computing peripheral devices such as display monitors, computer keyboards and the like. User communications device 104 may also include satnav components 137, which allow user communications device 104 to conduct a measurement or at least approximate the geolocation of user communications device 104 by receiving, for example, timing signals from global navigation satellite system (GNSS) satellites through GNSS network using communications channels, as is known.

The user communications device 106 may be, for example, a smart phone or tablet device with the same or a similar hardware architecture to that of the user communications device 104. User communications device 106, has, amongst other things, user interface 136*a* in the form of a touchscreen display and satnav components 138. User communications device 106 may be able to communicate with cellular network base stations through cellular telecommunications network using communications channels. User communications device 106 may be able to approximate its geolocation by receiving timing signals from the cellular network base stations through cellular telecommunications network as is known. Of course, user communications device 104 may also be able to approximate its geolocation by receiving timing signals from the cellular network base stations and user communications device 106 may be able to approximate its geolocation by receiving timing signals from the GNSS satellites, but these arrangements are omitted from FIG. 1 for the sake of simplicity.

The user communications device 104 and/or the user communications device 106 may be for communication with the communications server apparatus 102 for managing orders. In example implementations, the user communications device 104 may be a communications device that a consumer uses to interact with the communications server apparatus 102 (e.g., a user who creates or places an order, e.g., a scheduled order), and the user communications device 106 may be a communications device that a merchant (e.g., a seller) or a service provider (e.g., delivery agent) uses to interact with the communications server apparatus 102. In other example implementations, the user communications devices 102, 104 may be user devices of the same or different categories of users associated with one or more functionalities of the communications server apparatus 102.

Figure 2A:
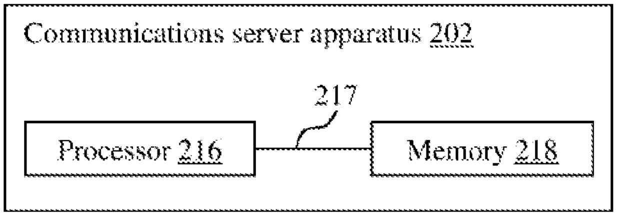
FIG. 2A shows a schematic block diagram illustrating a communications server apparatus for managing orders.
Figure 2B:
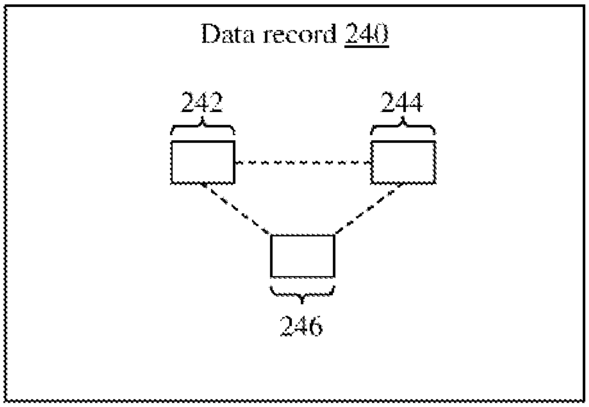
FIG. 2B shows a schematic block diagram illustrating a data record.

FIG. 2A shows a schematic block diagram illustrating a communications server apparatus 202 for managing orders, while FIG. 2B shows a schematic block diagram illustrating a data record 240.

The communications server apparatus 202 includes a processor 216 and a memory 218, where the communications server apparatus 202 is configured, under control of the processor 216 to execute instructions in the memory 218 to, in response to receiving order data indicative of a scheduled order associated with a user, the order data including an item data field indicative of at least one item and a time data field indicative of a delivery time defined by the user for delivery of the scheduled order to the user, and in a batching cycle, generate, in one or more data records 240, batch data 242 indicative of an order batch including the scheduled order and at least one unbatched order, quality data 244 indicative of a quality indicator for the order batch, and, if a batching efficiency condition is satisfied based on the quality indicator, release data 246 indicative of a release of the order batch for allocation of the order batch to a delivery agent for the scheduled order to be delivered by the delivery agent to the user at the delivery time. The processor 216 and the memory 218 may be coupled to each other (as represented by the line 217), e.g., physically coupled and/or electrically coupled.

In other words, there may be provided a communications server apparatus 202 for the management of orders. A user may make or place a scheduled order, with the user specifying at least one item (or product) as part of the scheduled order, and a delivery time (or delivery time period or window) for delivery of the scheduled order (or the at least one item contained therein) to the user. The user (or consumer or customer) may make the scheduled order, for example, on or via an online platform, e-commerce platform, website, etc., that, for example, may be hosted on or by the communications server apparatus 202.

In response to receiving (user) order data indicative of the scheduled order associated with (or corresponding to) the user, the order data having an item data field indicative of the at least one item, and a time data field indicative of the delivery time defined by the user to receive the scheduled order, the communications server apparatus 202 generates, in one or more data records 240, and in (or during) a batching cycle (or batching attempt), batch data 242 indicative of an order batch (or batch of orders) having the scheduled order and at least one (available or existing or additional) unbatched order (or yet-to-batched order), quality data 244 indicative of a quality indicator for (or associated with) the order batch, and, if a batching efficiency condition is satisfied based on the quality indicator, release data 246 indicative of the order batch to be released or being released for allocation of the order batch to a (one or single) delivery agent for the scheduled order (as part of the order batch) to be delivered to the user at the delivery time by the delivery agent allocated to the order batch. The delivery time may be a point in time (e.g., 10:00 am, 2:30 pm, etc.), or a time range (or window) (e.g., 9:00-11:00 am, 2:00-3:30 pm, etc.). The at least one unbatched order may be scheduled and/or instant order(s). The scheduled order and the at least one unbatched order may be processed in a batching process in the batching cycle.

The scheduled order may be placed into an order pool (or pool of orders) after creation of the scheduled order and prior to batching into the order batch. The order pool may contain orders (e.g., scheduled and/or instant order(s)). For batching into the order batch, the scheduled order and the at least one order included in the order pool may be selected from the order pool.

Generation of the data 242, 244, 246 may occur in or during any batching cycle after receiving of the order data by the communications server apparatus 202. As a non-limiting example, generation of the data 242, 244, 246 may occur in a batching cycle that occurs or is to occur first after receiving the order data (i.e., the immediate or next batching cycle that happens after the order data have been received, or the scheduled order having been placed into the order pool). In other words, in various embodiments, in a first batching cycle (i.e., the batching cycle immediately) after the order data have been received, the order batch may be determined or generated.

In various embodiments, the order batch may be allocated or assigned to a delivery agent that would then deliver the constituent orders (including the scheduled order) in the order batch, with the delivery of the scheduled order to the user at the delivery time defined by the user.

In various embodiments, the scheduled order may be fulfilled by a (external) merchant. The communications server apparatus 202 may further generate (based on the order data received) merchant data indicative of order information corresponding to the scheduled order, and transmit the merchant data to a communications device associated with the merchant.

In various embodiments, the communications server apparatus 202 may further generate agent data indicative of delivery information corresponding to the scheduled order, and transmit the agent data to a communications device associated with the delivery agent.

An order or each order, including a scheduled order, may have a corresponding allocation deadline. An allocation deadline refers to the maximum time that an order has before it has to be released for dispatch and allocation, e.g., the maximum time that an order can remain in an order pool before the order has to be dispatched and allocated. Therefore, an order that reaches or has passed its corresponding allocation deadline becomes an urgent order and, therefore, is released (immediately) for allocation for delivery. The allocation deadline of an order may be dependent on the delivery time corresponding to the order.

In the context of various embodiments, the quality indicator may be a measure of the quality of the order batch, e.g., in terms of the urgency of the order batch and the efficiency of the order batch.

In the context of various embodiments, the at least one item may be of any kind or nature, including, for example, food or food items, perishable items, groceries, furniture, toiletries, electronic items, etc.

In the context of various embodiments, the one or more data records 240 may include one or more batch data fields, one or more quality data fields, and one or more release data fields. The communications server apparatus 202 may generate, for or in the one or more batch data fields, the batch data 242. The communications server apparatus 202 may generate, for or in the one or more quality data fields, the quality data 244. The communications server apparatus 202 may generate, for or in the one or more release data fields, the release data 246.

In the context of various embodiments, the one or more data records 240 may be associated with or accessible by the communications server apparatus 202. The one or more data records 240 may be generated by the communications server apparatus 202. The one or more data records 240 may be modified or updated by the communications server apparatus 202. The one or more data records 240 may be stored at the communications server apparatus 202, e.g., in the memory 218.

The communications server apparatus 202 may generate allocation data indicative of the allocation of the order batch to the delivery agent (for delivery of the order batch). This may help to associate the order batch with the delivery agent assigned to the order batch. The delivery agent may be notified of or receive notification data indicative of the allocation or assignment of the order batch via a communications device of the delivery agent. The notification data may include or may be the allocation data.

If the batching efficiency condition is not satisfied based on the quality indicator, the communications server apparatus 202 may recycle the scheduled order, wherein the scheduled order that is recycled is to be subjected to an additional (or subsequent or next) batching cycle (or processed in a later batching cycle). The additional batching cycle may be immediately next to the current batching cycle. The at least one unbatched order may also be recycled. As a non-limiting example, the scheduled order and the at least one unbatched order may be moved or returned to the order pool for recycling.

For generating the quality data 244, the communications server apparatus 202 may generate first indicator data indicative of an urgency indicator for (or of) the order batch, and second indicator data indicative of an efficiency indicator for (or of) the order batch. The urgency indicator may provide an indication in the urgency of the order batch to be released for allocation, and subsequently, delivery. The efficiency indicator may provide an indication in the efficiency in the delivery of the order batch by the delivery agent. The urgency indicator and the efficiency indicator may make up the quality indicator. The first indicator data and the second indicator data may make up the quality data 244.

The urgency indicator may be or may include or may be represented by a score or value. For example, the urgency indicator may be or may include an urgency score for the order batch. Each order in the order batch, e.g., the scheduled order and the at least unbatched order, may have its corresponding or own urgency score, and the urgency indicator for the order batch is taken to be the lowest urgency score determined from the respective urgency scores of the scheduled order and the at least unbatched order. In other words, the urgency indicator may be based on or may be the lowest value of the respective urgency scores of the scheduled order and the at least unbatched order. The urgency score for an order is indicative of a number of batching cycles that are available for (or to) the order. The number of batching cycles that are available are determined relative to the allocation deadline corresponding to the order, which is the deadline by when the order has to be dispatched and allocated for delivery. In various embodiments, the lower the urgency score value, the more urgent the order is. In other words, the lower the urgency score value, the lower the number of batching cycles that are available for the order.

The urgency indicator (or the urgency score for the order batch) may be variable. An urgency score for an order may be variable. As a non-limiting example, the urgency indicator may decrease as the number of available batching cycles reduces.

The efficiency indicator may be or may include or may be represented by a score or value. For example, the efficiency indicator may be or may include an efficiency score for the order batch. As a non-limiting example, a higher efficiency indicator (or efficiency score for the order batch) may be indicative of a higher efficiency.

The communications server apparatus 202 may further determine (or obtain or retrieve), based on the urgency indicator, a set of efficiency parameter thresholds, and compare the efficiency indicator with the efficiency parameter thresholds, wherein the batching efficiency condition is satisfied if the efficiency indicator satisfies the efficiency parameter thresholds (e.g., if the efficiency indicator exceeds or is higher than the efficiency parameter thresholds). The batching efficiency condition is satisfied if the efficiency indicator satisfies each of or all the efficiency parameter thresholds. Each respective efficiency parameter threshold may correspond to a respective efficiency parameter type. For example, the efficiency parameter types may refer to a time efficiency, a distance efficiency and a cost efficiency. Other efficiency parameter types may additionally or alternatively be used.

In various embodiments, the set of efficiency parameter thresholds may be variable depending on (or according to) the urgency indicator. In other words, the efficiency parameter thresholds (or threshold values) may be different for different urgency indicators. As a non-limiting example, a set of higher or stricter efficiency parameter thresholds (i.e., a higher bar to satisfy) may be associated with a higher urgency indicator. As the urgency indicator decreases (i.e., the number of batching cycles available for batching decreases), the set of efficiency parameter thresholds may become more relaxed (i.e., a lower bar to satisfy).

The communications server apparatus 202 may further subject the scheduled order to a plurality of batching cycles until the batching efficiency condition is satisfied. The plurality of batching cycles may be carried out or started at regular intervals. The plurality of batching cycles may be consecutive batching cycles.

The scheduled order may be fulfilled (which, for example, may include preparation and/or packaging) by a (external) merchant, and the communications server apparatus 202 may further generate preparation data indicative of a preparation time duration that is required by the merchant to prepare the at least one item, the preparation time duration being determined (or predicted) based on the order data received. For example, the preparation time duration may be determined based on at least one of the nature (or type) of at least one item, the number of items, or the delivery time. As non-limiting examples, preparation may include packaging at least one item, and, for a food item, cooking the food item.

The communications server apparatus 202 may further generate (based on the order data received) merchant data indicative of order information corresponding to the scheduled order, and transmit the merchant data at a time determined based on the preparation time duration and the delivery time to a communications device associated with the merchant to notify the merchant of the scheduled order for preparation of the at least one item to minimise at least one of an idle time duration (at the merchant), prior to pick-up by the delivery agent, of the at least one item that is prepared, or a handling time duration between the pick-up and delivery of the at least one item by the delivery agent.

Such an approach may help to notify the merchant to begin preparation of at least one item, and/or may help to enable the scheduled order or the at least one item to be ready just-in-time for the delivery agent's planned arrival at the merchant's location. Nevertheless, it should be appreciated that a subsequent notification, separate from the merchant data, may be transmitted to the merchant's communications device to notify the merchant to start preparing the scheduled order or the at least one item contained therein.

The idle time duration refers to the duration from the time at least one item has been prepared up to pick-up by the delivery agent. The handling time duration refers to the duration from the time of pick-up by the delivery agent up to delivery to the user.

As a non-limiting example, the order information may include what at least one item is, quantity, any related instructions regarding the item, delivery time, identity of the user, etc.

In various embodiments, the merchant data may include pick-up data indicative of a time of arrival of the delivery agent at the merchant. This may provide an estimated or planned arrival time of the delivery agent at the merchant to pick up at least one item associated with the scheduled order. The communications server apparatus 202 may transmit the pick-up data to a communications device associated with the delivery agent allocated to the order batch.

The communications server apparatus 202 may further generate agent data indicative of delivery information corresponding to the scheduled order, and transmit the agent data to a communications device associated with the delivery agent at a time determined based on the preparation time duration and the delivery time to notify the delivery agent of a pick-up of the at least one item (at or from the merchant) to minimise at least one of a waiting time duration of the delivery agent at the merchant (or merchant's location), or a handling time duration between the pick-up and delivery of the at least one item by the delivery agent (or transit time duration after the pick-up and up to the delivery of the at least one item by the delivery agent to the user). Such an approach may be referred to as delayed allocation.

As a non-limiting example, for each order, the delivery information may include the delivery time, the delivery location, the user or consumer the order is to be delivered to, etc.

The merchant data and the agent data may be transmitted to the respective communications devices at the same time. In some embodiments, the agent data may be transmitted at a time that is later than that for the merchant data, e.g., in situations where the preparation time duration may be long and the merchant is to be notified first.

In the context of various embodiments, it should be appreciated that in a or any or each batching cycle, the communications server apparatus 202 may generate batch data (e.g., 242) indicative of an order batch including a/the scheduled order and at least one unbatched order, quality data (e.g., 244) indicative of a quality indicator for the order batch, and, if a batching efficiency condition is satisfied based on the quality indicator, release data (e.g., 246) indicative of a release of the order batch for allocation of the order batch to a delivery agent for the scheduled order to be delivered by the delivery agent to the user at the delivery time.

Figure 2C:
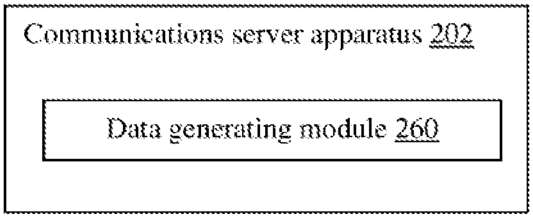
FIG. 2C shows a schematic block diagram illustrating architecture component of the communications server apparatus of FIG. 2A.

FIG. 2C shows a schematic block diagram illustrating architecture component of the communications server apparatus 202. That is, the communications server apparatus 202 may further include a data generating module 260 to generate the batch data 242, the quality data 244, and the release data 246 (see FIG. 2B).

Figure 2D:
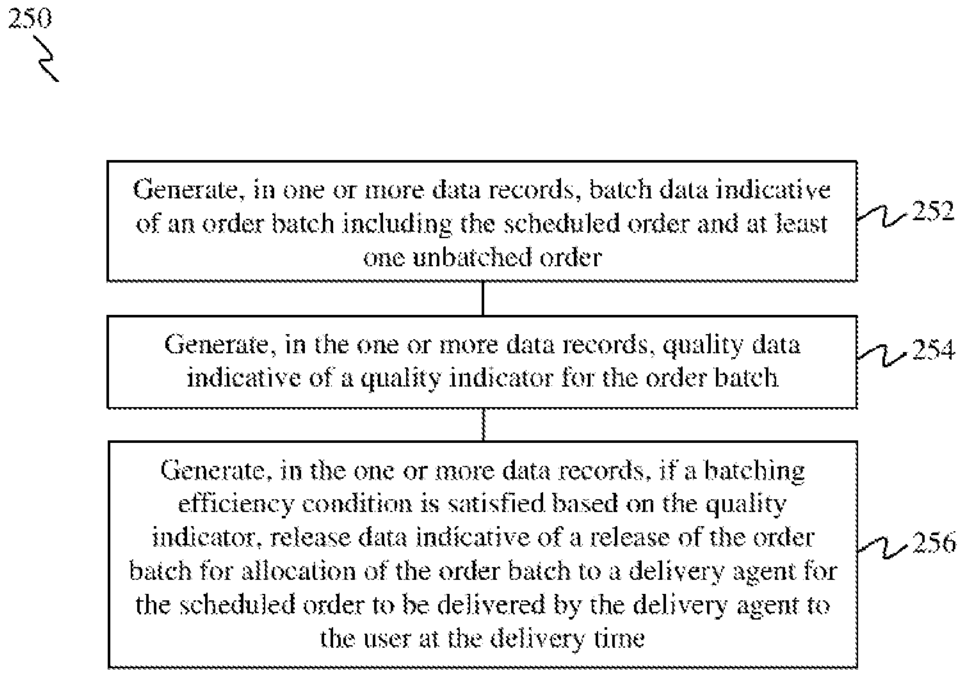
FIG. 2D shows a flow chart illustrating a method for managing orders.

FIG. 2D shows a flow chart 250 illustrating a method for managing orders. In response to receiving order data indicative of a scheduled order associated with a user, the order data having an item data field indicative of at least one item and a time data field indicative of a delivery time defined by the user for delivery of the scheduled order to the user, and in a batching cycle, at 252, batch data indicative of an order batch including the scheduled order and at least one unbatched order are generated in one or more data records, at 254, quality data indicative of a quality indicator for the order batch are generated in the one or more data records, and at 256, if a batching efficiency condition is satisfied based on the quality indicator, release data indicative of a release of the order batch for allocation of the order batch to a delivery agent for the scheduled order to be delivered by the delivery agent to the user at the delivery time are generated in the one or more data records.

The method may further include generating allocation data indicative of the allocation of the order batch to the delivery agent.

If the batching efficiency condition is not satisfied based on the quality indicator, the scheduled order is recycled, wherein the scheduled order that is recycled is to be subjected to an additional batching cycle. This means that the method may include recycling the scheduled order, and subjecting the scheduled order that is recycled to another batching cycle.

At 254, first indicator data indicative of an urgency indicator for the order batch, and second indicator data indicative of an efficiency indicator for the order batch are generated.

The method may further include determining, based on the urgency indicator, a set of efficiency parameter thresholds, and comparing the efficiency indicator with the efficiency parameter thresholds, wherein the batching efficiency condition is satisfied if the efficiency indicator satisfies the efficiency parameter thresholds. The set of efficiency parameter thresholds may be variable depending on the urgency indicator.

The method may further include subjecting the scheduled order to a plurality of batching cycles until the batching efficiency condition is satisfied.

The scheduled order may be fulfilled by a merchant, and preparation data indicative of a preparation time duration that may be required by the merchant to prepare at least one item may be generated, the preparation time duration being determined based on the order data received.

In various embodiments, merchant data indicative of order information corresponding to the scheduled order may be generated, and the merchant data may be transmitted at a time determined based on the preparation time duration and the delivery time to a communications device associated with the merchant to notify the merchant of the scheduled order for preparation of the at least one item to minimise at least one of an idle time duration, prior to pick-up by the delivery agent, of the at least one item that is prepared, or a handling time duration between the pick-up and delivery of the at least one item by the delivery agent.

In various embodiments, agent data indicative of delivery information corresponding to the scheduled order may be generated, and the agent data may be transmitted to a communications device associated with the delivery agent at a time determined based on the preparation time duration and the delivery time to notify the delivery agent of a pick-up of the at least one item to minimise at least one of a waiting time duration of the delivery agent at the merchant, or a handling time duration between the pick-up and delivery of the at least one item by the delivery agent.

It should be appreciated that descriptions in the context of the communications server apparatus 202 may correspondingly be applicable in relation to the method as described in the context of the flow chart 250, and vice versa.

The method as described in the context of the flow chart 250 may be performed in a communications server apparatus (e.g., 202, FIG. 2A) for managing orders, under control of a processor of the apparatus. The method may further include, executing under control of the processor, instructions stored in a memory of the communications server apparatus, operating a data generating module (e.g., 260, FIG. 2C) to generate batch data (e.g., 242, FIG. 2B), quality data (e.g., 244, FIG. 2B), and release data (e.g., 246, FIG. 2B).

There may also be provided a computer program product having instructions for implementing the method for managing orders described herein.

There may also be provided a computer program having instructions for implementing the method for managing orders described herein.

There may further be provided a non-transitory storage medium storing instructions, which, when executed by a processor, cause the processor to perform the method for managing orders described herein.

Various embodiments may further provide a communications system for managing orders, having a communications server apparatus, at least one user communications device and communications network equipment operable for the communications server apparatus and the at least one user communications device to establish communication with each other therethrough, wherein the at least one user communications device includes a first processor and a first memory, the at least one user communications device being configured, under control of the first processor, to execute first instructions in the first memory to transmit, for receipt by the communications server apparatus for processing, order data indicative of a scheduled order associated with a user, the order data including an item data field indicative of at least one item and a time data field indicative of a delivery time defined by the user for delivery of the scheduled order to the user, and wherein the communications server apparatus includes a second processor and a second memory, the communications server apparatus being configured, under control of the second processor, to execute second instructions in the second memory to, in response to receiving data indicative of the order data, generate, in one or more data records, and in a batching cycle, batch data indicative of an order batch having the scheduled order and at least one unbatched order, quality data indicative of a quality indicator for the order batch, and, if a batching efficiency condition is satisfied based on the quality indicator, release data indicative of a release of the order batch for allocation of the order batch to a delivery agent for the scheduled order to be delivered by the delivery agent to the user at the delivery time.

In the context of various embodiments, a communications server apparatus as described herein (e.g., the communications server apparatus 202) may be a single server, or have the functionality performed by the communications server apparatus distributed across multiple server components.

In the context of various embodiments, a (user) communications device may include, but not limited to, a smart phone, tablet, handheld/portable communications device, desktop or laptop computer, terminal computer, etc.

In the context of various embodiments, a delivery agent may include a human (who, for example, may travel on foot and/or travel via a transportation vehicle), a robot, or an autonomous vehicle. The transportation vehicle and/or the autonomous vehicle may travel on or through one or more of land, sea and air.

In the context of various embodiments, an "App" or an "application" may be installed on a (user) communications device and may include processor-executable instructions for execution on the device. As a non-limiting example, making or placing a scheduled order may be carried out via an App. As further non-limiting examples, the merchant and/or the delivery agent may receive respective information, notification and data via the App.

Various embodiments or techniques will now be further described in detail.

The techniques disclosed herein exploit the fact that scheduled orders are placed in advance and make use of the additional time to consider the scheduled orders for batching with other orders (e.g., other scheduled orders and/or instant orders), while ensuring that the scheduled orders are delivered within the scheduled delivery time selected by the consumers or customers. Scheduled orders are included in a batching or order pool, which holds a set of orders which are to be considered for batching now (current time), e.g., a few hours before the desired delivery time window. This is as opposed to a few minutes before if the known approaches of delaying the processing of the scheduled orders such that it is equivalent to an instant order are used.

As instant orders, and scheduled orders in known approaches that are effectively treated as instant orders, are to be fulfilled immediately and delivered as soon as possible, such orders are allocated to delivery agents without batching, or if any batching is carried out, there may only be a single batching attempt. Further, other considerations, e.g., including whether the batch of orders meet any efficiency condition, would not come into play since such orders have to be, in any case, allocated and delivered as soon as possible in the known approaches.

The techniques disclosed herein may provide two systems: (1) a batching engine, and (2) an order pool with recycling, and the interaction between the two systems.

Figure 3:
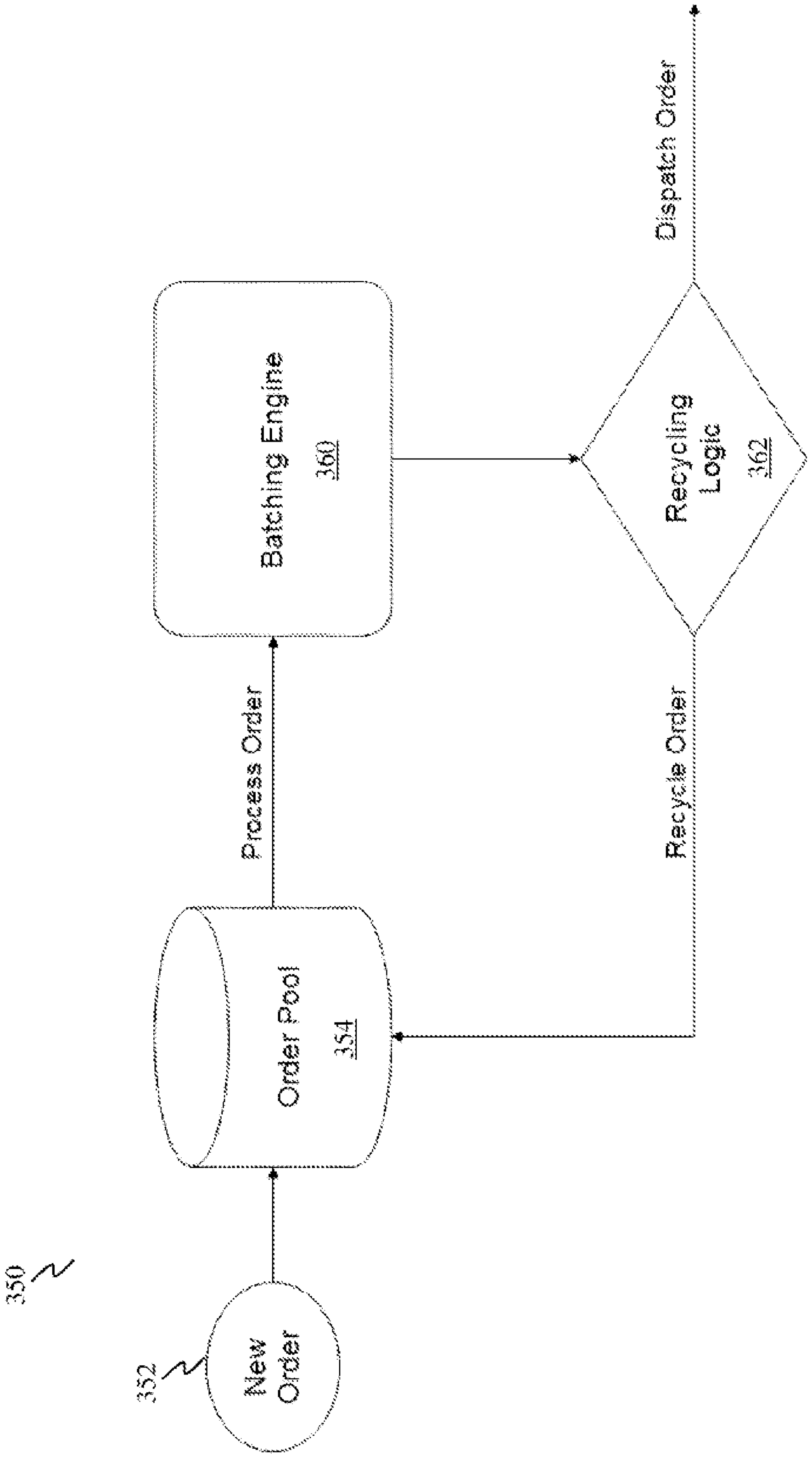
FIG. 3 shows a diagram illustrating a system with batching and recycling cycle of various embodiments.

FIG. 3 shows a diagram illustrating a system 350 with batching and recycling cycle. The system 350 may include an order pool 354, a batching engine 360, and a recycling logic 362. The batching engine 360 may be communicatively or operatively coupled to the order pool 354. The recycling logic 362 may be communicatively or operatively coupled to the order pool 354 and the batching engine 360.

A new order 352 that has been made or placed by a user or consumer, such as a scheduled order, may be placed in the order pool 354. In various embodiments, the order pool 354 may already contain one or more orders, e.g., one or more scheduled orders and/or one or more instant orders.

As a non-limiting example, at every fixed time interval, orders in the pool 354 may be batched through the batching engine 360. For example, the batching engine 360 may implement an algorithm or method that solves a capacitated vehicle routing problem with pickup-and-delivery and time window constraints (C-VRP-PD-TW). This may ensure that the resulting trips (e.g., for a batch containing multiple orders) satisfy all the required delivery time requirements, which include the scheduled delivery time window(s) selected by the consumer(s) for scheduled order(s). It should be appreciated that it is possible to batch a scheduled order with an instant order if both orders are in the pool 354 simultaneously at a given point in time.

In relation to the order pool 354 with a recycling approach, since there is a longer time to consider the scheduled orders for batching, this available time is used by holding the scheduled orders in the pool 354 until a suitable order batch that is of high quality is found or determined. The batch that is formed by, for example, the VRP solver as described above in relation to the batching engine 360, which contains a scheduled order is only released from the pool 354 to be dispatched and allocated to a driver partner (or delivery agent) when the batching efficiency (e.g., determined via the recycling logic 362) for the order batch containing the scheduled order is high and the resulting delivery trip for the batch results in the scheduled order being delivered within the desired delivery time window. Otherwise, the scheduled order is returned to the order pool 354 for future consideration, and this process is referred to as recycling.

Accordingly, as a non-limiting example, the order pool service 354 may receive the orders 352 created by end-user applications, and may store those orders 352 into a database (not shown). After every pooling interval, the order pool service 354 may cluster the stored orders 352, and send to the batching engine service 360. The batching engine service 360 receives a list of orders 352, and generates the batched trips. The recycling service 362 may receive the batched trips, and calculate the efficiency score. Based on the efficiency score, and one or more recycling rules, the recycling service 362 determines which batched trips should be dispatched, and which batched trips should be recycled. For those orders that need to be recycled, the orders are sent to the order pool service 354.

In various embodiments, as a non-limiting example, the order pool 354, the batching engine 360, and the recycling logic 362 may be implemented as different servers.

In contrast to known techniques, within the period between the time of creation of the scheduled order (e.g., 352) and the time when the scheduled order has to be processed (e.g., the time deadline that the scheduled order has to be allocated to a delivery agent such that it can be delivered within the user's desired time slot, or the "allocation deadline" to be further described below) (based on the embodiments/techniques disclosed herein), the order is being considered for batching with other orders instead of waiting idly. Referring to FIG. 3, this may be seen as letting the scheduled orders go through the batching and recycling cycle instead of waiting in the order pool 354. In addition, with the recycling mechanism, (only) high-quality batched trips can be released before reaching the time limit (or deadline) to be released for dispatch and allocation. In this manner, higher batching efficiencies of scheduled orders may be achieved. This may be accomplished through the interaction between the two systems, i.e., batching engine 360, and order pool 354 (with recycling), in an implementation to be described in more detail below.

The two component systems will first be described individually, before the interaction between them is described.

(i) Batching Engine 360

The role of the batching engine 360 is for one or more of the following:

I. address or solve a vehicle routing problem with pickup and delivery, and time window constraints;

II. form batches of orders which meet one or more or all capacity and time window requirements;

III. calculate and assign efficiency and urgency scores to the batches formed.

The batching engine 360 is effectively a vehicle routing problem (VRP) solver equipped with a set of solution algorithms or methods. As a non-limiting example, it is used to solve the CVRPPDTW as mentioned above. A pool (or group or bunch) of orders that may come with various requirements or parameters, for example, sizes, pickup and delivery locations, delivery time windows, are input to the batching engine 360. The engine 360 may then address or solve the problem with the equipped algorithms and may return an optimal solution that includes batched and unbatched trips that satisfy (all) the constraints such as capacity, time window, pickup and delivery pairs. From the perspective of the batching engine 360, the difference between scheduled and instant orders is that the delivery time window of a scheduled order is defined by the consumer (or user) who made or placed the scheduled order, and that of an instant order is based on calculation of expected delivery time. In other words, the delivery time window for a scheduled order is a consumer-defined requirement or parameter, while the delivery time window for an instant order is a system-determined parameter for when the instant order is expected to be delivered. Therefore, the delivery time window for a scheduled order is defined in advance of delivery by a consumer or user, and, hence, can be known in advance.

The batching engine 360 may calculate and assign two scores for each order batch:

1) Efficiency score: a measure of the time saving, and/or distance saving, and/or cost saving. It may be defined as the ratio of the total time, or distance, or cost if the orders in a given batch are delivered by separate drivers (e.g., in a scenario where there is no batching), to the time, or distance, or cost of delivering the orders in the order batch. The larger the efficiency score, the better.

Using distance efficiency as an example, the distance efficiency score may be calculated as the total direct (unbatched) delivery distance divided by the total batched delivery distance. For instance, given three orders with direct delivery distances of 4 km, 3 km and 7 km respectively, the batching system may generate a single batched trip with a total distance of 10 km. The distance efficiency score may, therefore, be determined as (4+3 +7)/10=1.4. If the batching system generates a single batched trip with a total distance of 8 km, then the efficiency distance score is (4+3+7)/8=1.75. The higher the score, the more efficient the batch is. Time and cost efficiencies may be computed in a similar fashion.

2) Urgency score: a measure of how many more batching attempts are available for an order (e.g., dependent on an "allocation deadline" to be further described below). This may be defined as the time left available for batching divided by the fixed batching interval. For example, an order is created at 10:00 am, and the predefined available time for batching is 60 minutes, meaning that the order must be dispatched before 11:00 am. The order pool service may cluster the order and send it to the batching service every 10 minutes (the fixed batching interval). As an example, at 10:20 am, the urgency score may be calculated as 40 minutes (i.e., the time left available for batching) divided by 10 minutes (i.e., the fixed batching interval), which is 4 (which is equivalent to the number of batching cycles available). As a further example, at 10:54 am, the urgency score is calculated as 6 minutes (i.e., the time left available for batching) divided by 10 minutes (i.e., the fixed batching interval), which is 0.6. The lower the urgency score is, the more urgent the order is needed to be dispatched. For a batch of orders, the urgency score of the batch is the lowest urgency score of the constituent orders. The lower the urgency score, the more urgent (closer to the allocation deadline) the order is.

Since the techniques disclosed herein are to consider a scheduled order for batching earlier, instead of as an instant order, it may be possible for the scheduled order to be en-route for a long time. Being en-route for a longer time takes up space within the transport vehicle, reducing the capacity of the vehicle to take in other items for delivery. Further, as an example, for a food item, being en-route for a long time may degrade the food freshness and quality. In view of the above, for scheduled orders, the batching engine 360 may ensure that in the resulting batched trip, the scheduled orders may or do not stay with the delivery partner (or delivery agent) longer than a defined or predetermined time so as to ensure, for example, freshness and quality of a food item. This may be referred to as a handling duration, which may be defined as the time between delivery and pickup by the delivery partner. The handling duration may be capped according to the items (e.g., food) being delivered; for example, cold dessert and hot soup are more time-sensitive than rice bowls, and hence may have a shorter handling duration limit.

Taking into consideration one or more of the above-mentioned parameters or requirements, a mechanism may be implemented for delaying allocation of an order batch containing scheduled orders, after a batch has been created and released for dispatch and allocation, so that each of the scheduled orders is not delivered too early, the corresponding merchant for the scheduled order is ready, and that the (food) handling duration may be within the tolerance limit. This "earliness" consideration (which may be referred to as the "allocation delay") is another consideration with respect to scheduled orders which does not exist or is not provided for instant orders. The allocation delay may be determined or computed by trimming the resulting batched trip such that the predicted "waiting time" at the merchant (e.g., due to readiness and/or food preparation) and/or at the consumer (e.g., due to arriving earlier than the pre-selected delivery time slot) may be minimised, while still meeting (all) the other requirements (such as delivery time window, handling duration limit, etc.). This may also help with merchant workload when many orders are scheduled within the same time slot (for example, during lunch hour for food items), as the orders are received and processed in advance.

(ii) Order Pool 354 with Recycling

The role of the order pool 354 with recycling is for one or more of the following:

I. store order information as each order is created and waiting for processing;
II. trigger a round of batching attempt at each fixed time interval;
III. determine if an order is to be processed in the current batching attempt (The decision may be made by comparing the current timestamp with a pre-determined "time to start processing" associated with the order. If the current time is before the time to process, the order is held in the order pool. Otherwise, the order is processed in the current batching attempt. If an order is processed too early, the likelihood of generating a batch (containing the order) that fulfils all the requirements (e.g., delivery window, etc) is low. In this case, computational resources may be wasted. Conversely, if an order is processed later, it becomes more similar to the prior art which processes a scheduled order as if it is an instant order. This is a balancing act between efficient computational resource usage and generation of efficient batches.
IV. determine if a batched formed by the batching engine 360 is to be released for dispatch and allocation, or to be recycled (hold in the pool 354) for the next round of batching attempt.

The "time to start processing" may be determined, by way of a non-limiting example, by analysing the historical operational data (e.g., data related to historical order(s)) in terms of delivery earliness/lateness (e.g., defined as the difference between actual delivery time and expected scheduled delivery time), and one or more various efficiency metrics and computational resource usage. From the analysed data, statistical measures like percentile/quantile may be used to select the appropriate values accordingly. For example, the "time to start processing" may be determined as 2 hours such that 95 percent of the scheduled orders can be delivered while satisfying (all) the delivery requirements and efficiency criteria and keeping within the computational budget.

The order pool 354 includes a collection or group of new and recycled orders, which are to be processed. Each time a new order 352 is created, the order 352 enters the order pool 354. There may be a maximum time for which an order can stay in this order pool 354 before it has to be released for dispatch and allocation, either as part of a batch or as an individual order—this is called the "allocation deadline". These orders then go through the batching engine 360 at fixed time intervals to form batched trips or batched orders. As a non-limiting example, the fixed time interval can be 30 seconds, meaning every 30 seconds, the orders will go through the batching engine 360 to be processed until they are dispatched as batched trips or as individual orders. It should be appreciated that other fixed time intervals may be used, for example, 1 minute, 5 minutes, 10 minutes, 15 minutes, etc.

The order pool 354 may also cluster orders based on their spatial and/or temporal information, to manage the size of the vehicle routing problem to be handled by the batching engine 360. This may ensure that the batching engine resources are used in an efficient manner to provide a high quality solution within a limited solving time (e.g., in the range of 2-5 seconds).

Not all the batched trips may be released for dispatch and allocation at each round of batching, since the batched orders need to go through a recycling logic 362. The recycling logic 362 may be part of or integrated with the order pool 354. If a certain order batch is found to be not or insufficiently efficient, the batch is broken up and all the individual orders within the batch are sent back to the order pool 354. The orders then go through the batching engine 360 together with other new orders and/or recycled orders at the next fixed time interval for batching. The orders are (only) released if they pass the efficiency requirements or reach the allocation time limit or deadline, and become urgent orders.

In the recycling logic 362, the batching efficiency of a batch may be determined. There may be different efficiency requirements (or threshold levels) for batches, depending on the corresponding batch's urgency score. In various embodiments, the efficiency threshold may be higher for batches with higher urgency scores (i.e., the orders in the batch are still eligible for one or more future batching attempts), and the threshold may be reduced (e.g., gradually lowered) as the number of batching attempts available decreases (i.e., becoming nearer to the allocation deadline). In such a way, the batch quality and efficiency may be improved.

Figure 4:
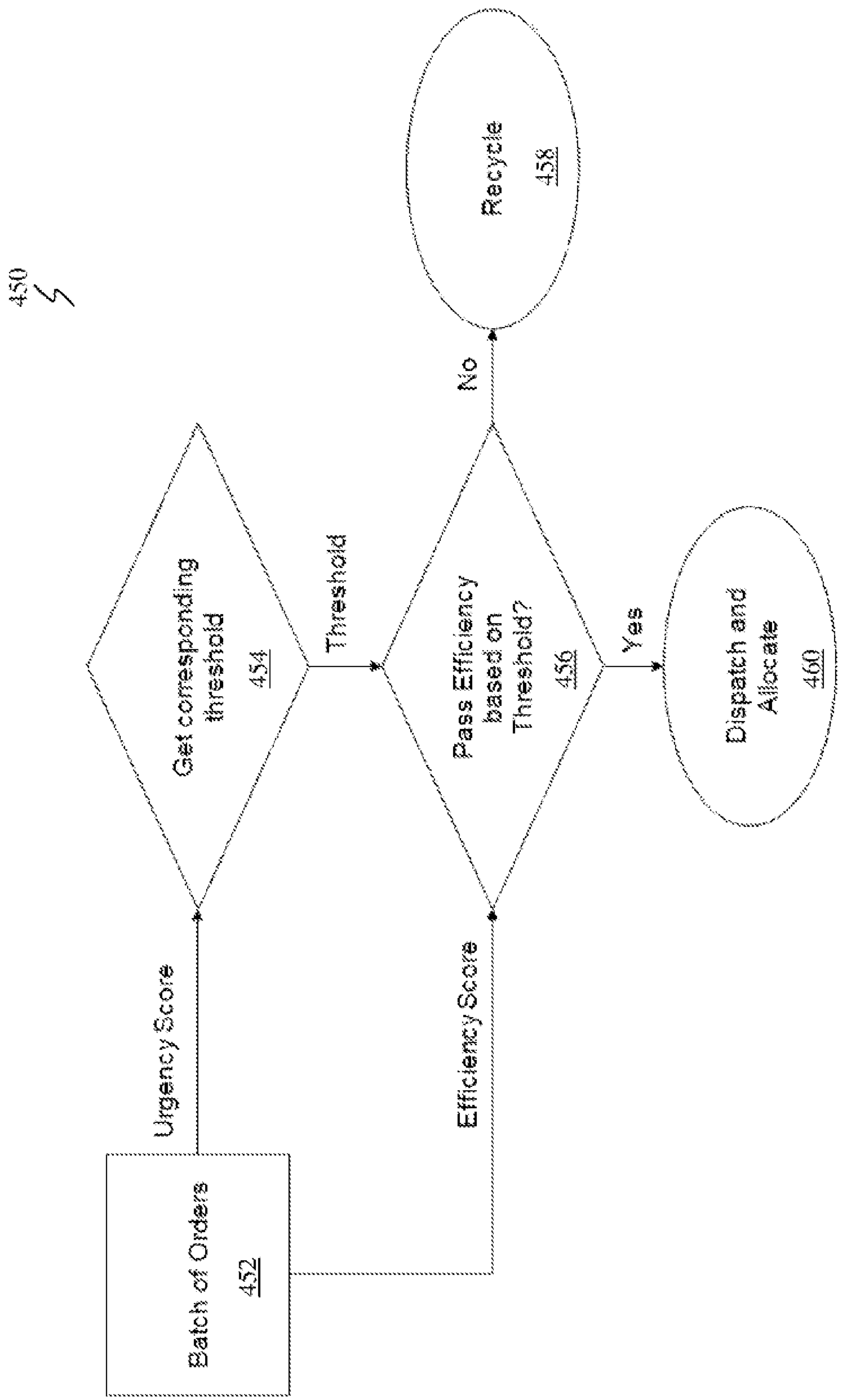
FIG. 4 shows a diagram illustrating a flowchart associated with a recycling logic of various embodiments.

FIG. 4 illustrates, as part of the recycling logic 362 (FIG. 3), the usage of both urgency and efficiency scores to determine if a batch is to be recycled or to be dispatched for allocation. For a batch of orders 452, the urgency score and the efficiency score may be determined. At 454, the efficiency score threshold level corresponding to the computed urgency score may be obtained or determined. At 456, the determined efficiency score is checked or compared against the threshold. If the determined efficiency score satisfies the threshold, the batch 452 is dispatched and allocated, otherwise, the batch 452 (and all of its constituent orders) is recycled, i.e., the orders are placed back into the order pool 354 (FIG. 3) for processing in the next batching attempt.

Figure 5A:
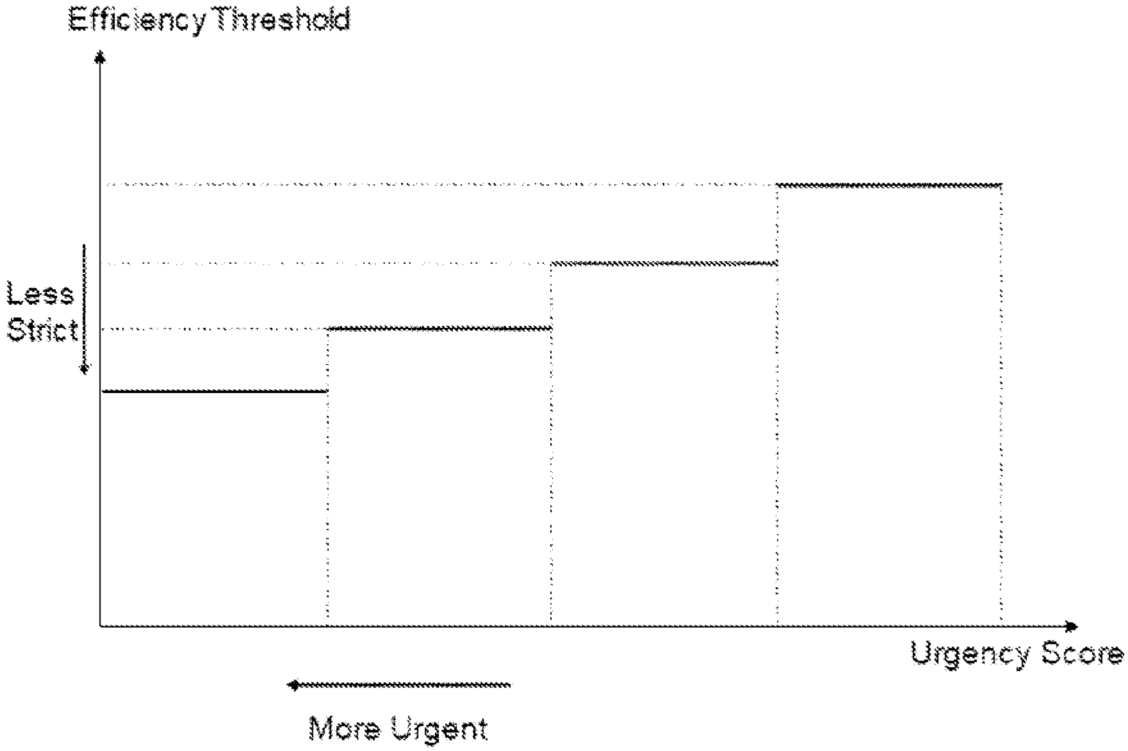
FIG. 5A shows a plot of efficiency thresholds based on the urgency score.

FIG. 5A provides an illustration of how the efficiency threshold may be varied based on the urgency score. As described above, the urgency score is a measure of how many more batching attempts are available—the smaller the urgency score, the more urgent it is. As shown in FIG. 5A, the threshold may be relaxed (lowered) as the batch becomes more urgent (lower urgency score). The threshold may be high(er) when the order is not urgent, as there may be further or many batching attempts available-this ensures that scheduled orders, which may be still far from the desired delivery time, and hence with one or more batching attempts still available, are (only) released for dispatch and allocation if the resulting batching efficiency is high. Otherwise, they are subject to additional rounds of batching attempts. While the batch with the scheduled orders is (only) released subject to the order batch meeting the batching efficiency, it should be appreciated that a scheduled order may already be subject to processing for batching with one or more other orders in advance of the delivery time after the scheduled order has been created.

Figure 5B:
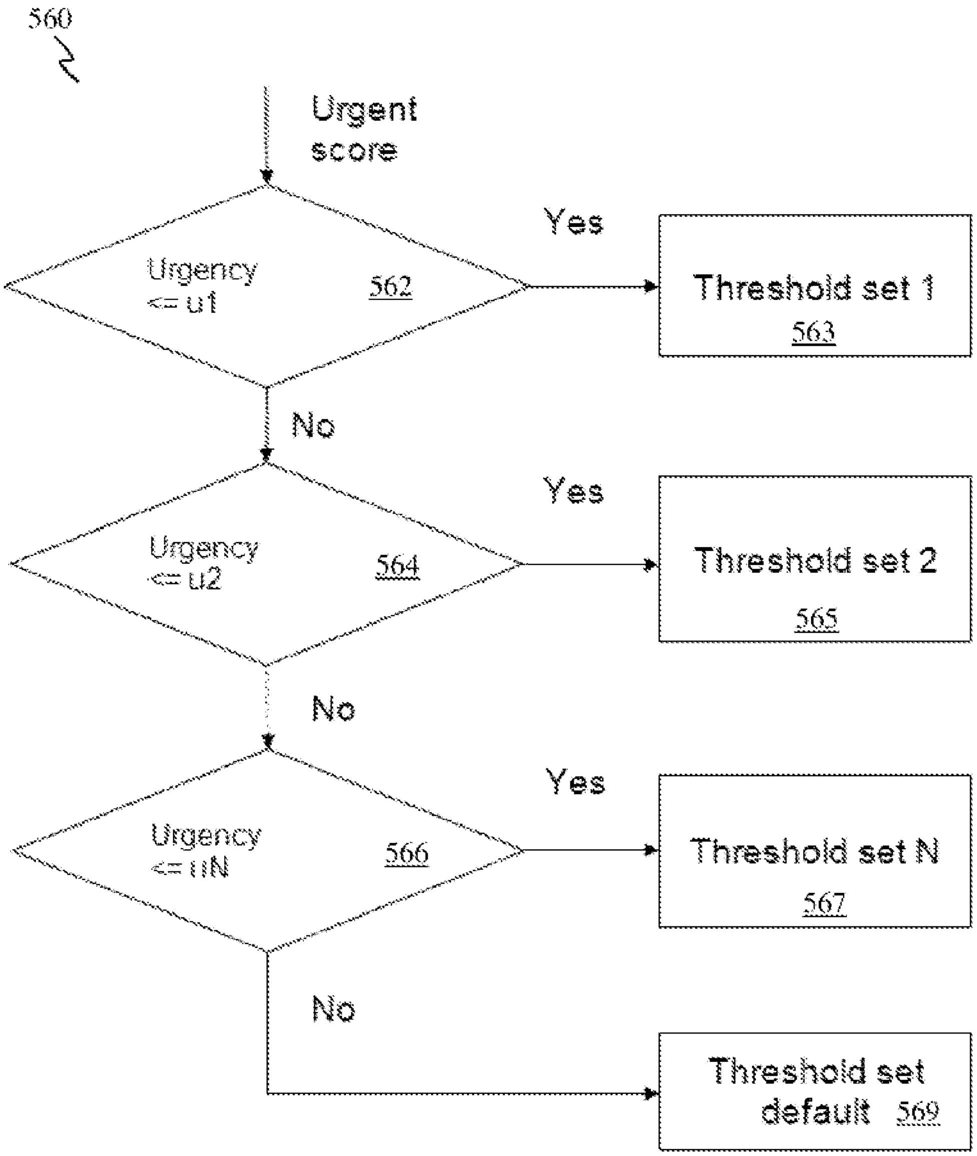
FIG. 5B shows a diagram illustrating various threshold sets based on the urgency score.

In each round of batching attempt or batching cycle, an efficiency threshold set (or a set of efficiency parameter thresholds) may be determined first based on the corresponding urgency score that is determined at that round of batching attempt. FIG. 5B shows a diagram 560 illustrating various threshold sets based on the urgency score. An urgent score that has been determined may be checked, at 562, as to whether the score is equal to or less than a value "u1" (i.e., ≤u1). If yes, the threshold set 1 563 is obtained or used. If the comparison result at 562 is in the negative, the urgency score is then compared, at 564, against another value "u2" to determine whether the urgency score is equal to or less than the value "u2" (i.e., ≤u2). If yes, the threshold set 2 565 is obtained or used. Otherwise, the urgency score is next compared against a defined next value. This process may proceed until a defined final value "uN" if the preceding comparisons lead to negative results, where N may be any number higher than 2. At 566, the urgency score is judged against the value "uN" to determine whether the urgency score is equal to or less than the (final) value "uN" (i.e., ≤uN). If the comparison result at 566 is in the positive, the threshold set N 567 is obtained or used. Otherwise, the threshold set default 569 is obtained or used. It should be appreciated that the "u" values for the urgency score to be compared against has the relationship u1<u2< . . . <uN (i.e., u1,u2, . . . , uN are in an ascending order). As a non-limiting example of a set of u1, u2, . . . , and uN, the values may be u1=1, u2=3, . . . , uN=999. However, it should be appreciated that different values may be used.

As described in the urgency score numerical example described herein, the lower the urgency score, the more urgent the order needs to be dispatched, thus, the more relaxed set of threshold levels is used. Therefore, the threshold set 1 563 is the (relatively) most relaxed set of threshold levels (e.g., associated with lower threshold levels to be satisfied) while the threshold set default 569 is the (relatively) strictest set of threshold levels (e.g., associated with higher threshold levels to be satisfied).

Figure 5C:
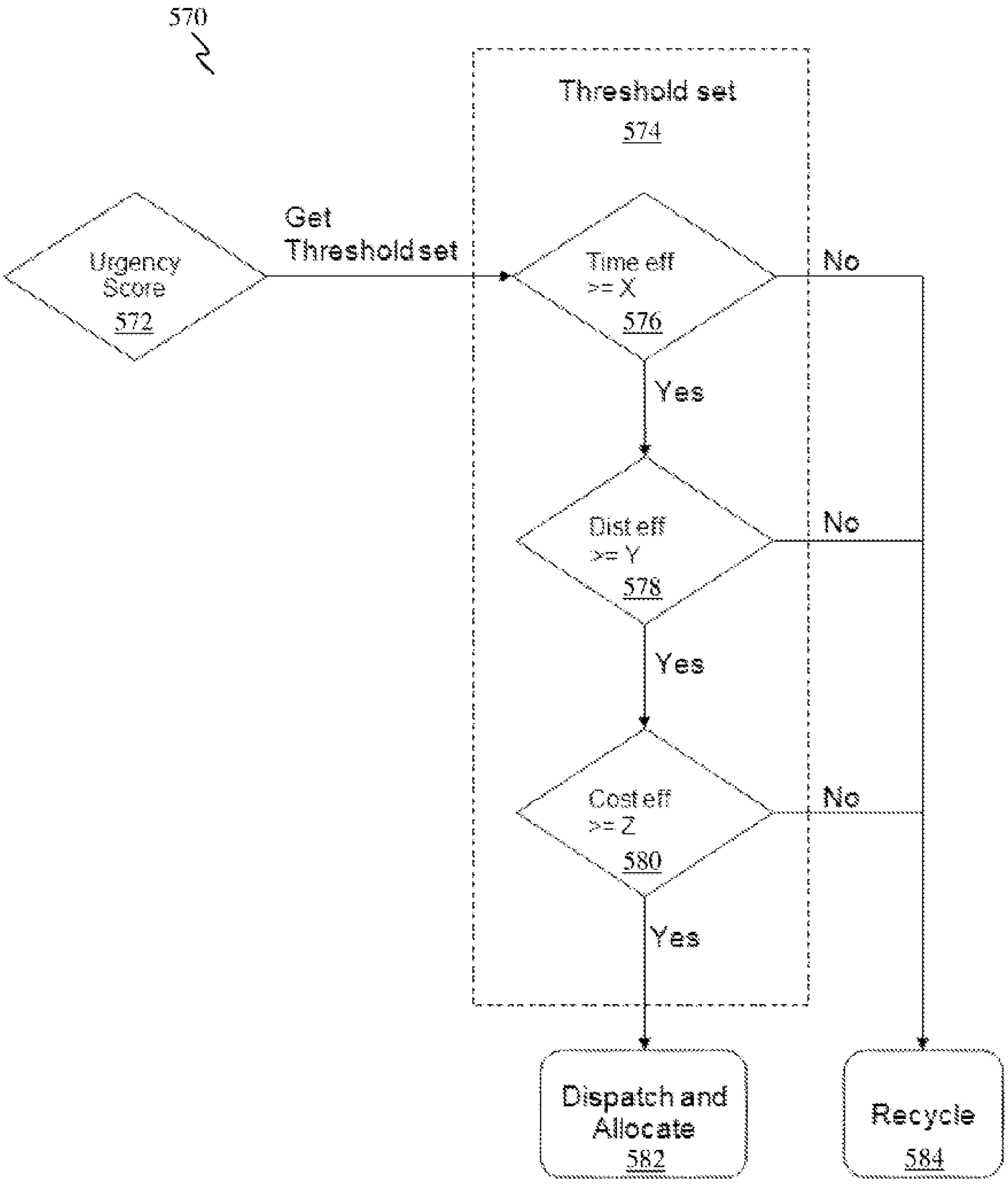
FIG. 5C shows a diagram illustrating thresholds for different efficiency types.

Each efficiency threshold set, e.g., 563, 565, 567, 569, may have a group of efficiency parameter thresholds or threshold values. Each group of threshold values may include different thresholds for different efficiency types, e.g., time efficiency threshold, distance efficiency threshold, cost efficiency threshold. FIG. 5C shows a diagram 570 illustrating thresholds for different efficiency parameter types that may be contained in a group of threshold values (i.e., efficiency threshold set).

For a batch of orders having an associated urgency score 572, a threshold set 574 corresponding to the urgency score 572 may be obtained or determined. The threshold set 574 may include a number of different efficiency parameter types such that the efficiency score determined for the order batch may be judged against a time efficiency at 576, against a distance efficiency at 578, and against a cost efficiency at 580. The efficiency score may be compared, at 576, against the threshold X for time efficiency. If the efficiency score is not more than or equal to X, the associated batch (with the constituent orders therein) is recycled 584. If time efficiency score ≥X (as a non-limiting example, X may be 1.1), the process proceeds to 578 where the efficiency score may be compared against the threshold Y for distance efficiency. If the efficiency score is not more than or equal to Y, the associated batch (with the constituent orders therein) is recycled 584. If distance efficiency score ≥Y (as a non-limiting example, Y may be 1.0), the process proceeds to 580 where the efficiency score may be compared against the threshold Z for cost efficiency. If the efficiency score is not more than or equal to Z, the associated batch (with the constituent orders therein) is recycled 584. If cost efficiency score ≥Z (as a non-limiting example, Z may be 1.0), the batch is dispatched and allocated 582. Accordingly, the batches that pass all the threshold checks are sent to the allocation process 582; otherwise the batches are recycled 584. It should be appreciated that the efficiency score may be judged against each of the time efficiency, the distance efficiency, and the cost efficiency in any order, and the order shown in FIG. 5C is a non-limiting example. Further, it should be appreciated that other values may be used for each of the thresholds X, Y, and Z. For example, one or more of the thresholds X, Y, and Z may be of a value that is between 1.0 and 2.0, e.g., between 1.0 and 1.5, between 1.0 and 1.2, or between 1.2 and 1.5.

The variable efficiency threshold may enable scheduled orders to be considered for batching earlier instead of delaying them to be processed as instant orders. Scheduled orders far from the selected delivery time are "not urgent" in the urgency score scale and hence has a corresponding high(er) efficiency threshold. This means that the batches containing scheduled orders have to meet a high(er) efficiency requirement on top of fulfilling (all) the delivery window requirements before they can be dispatched for allocation.

Figure 6:
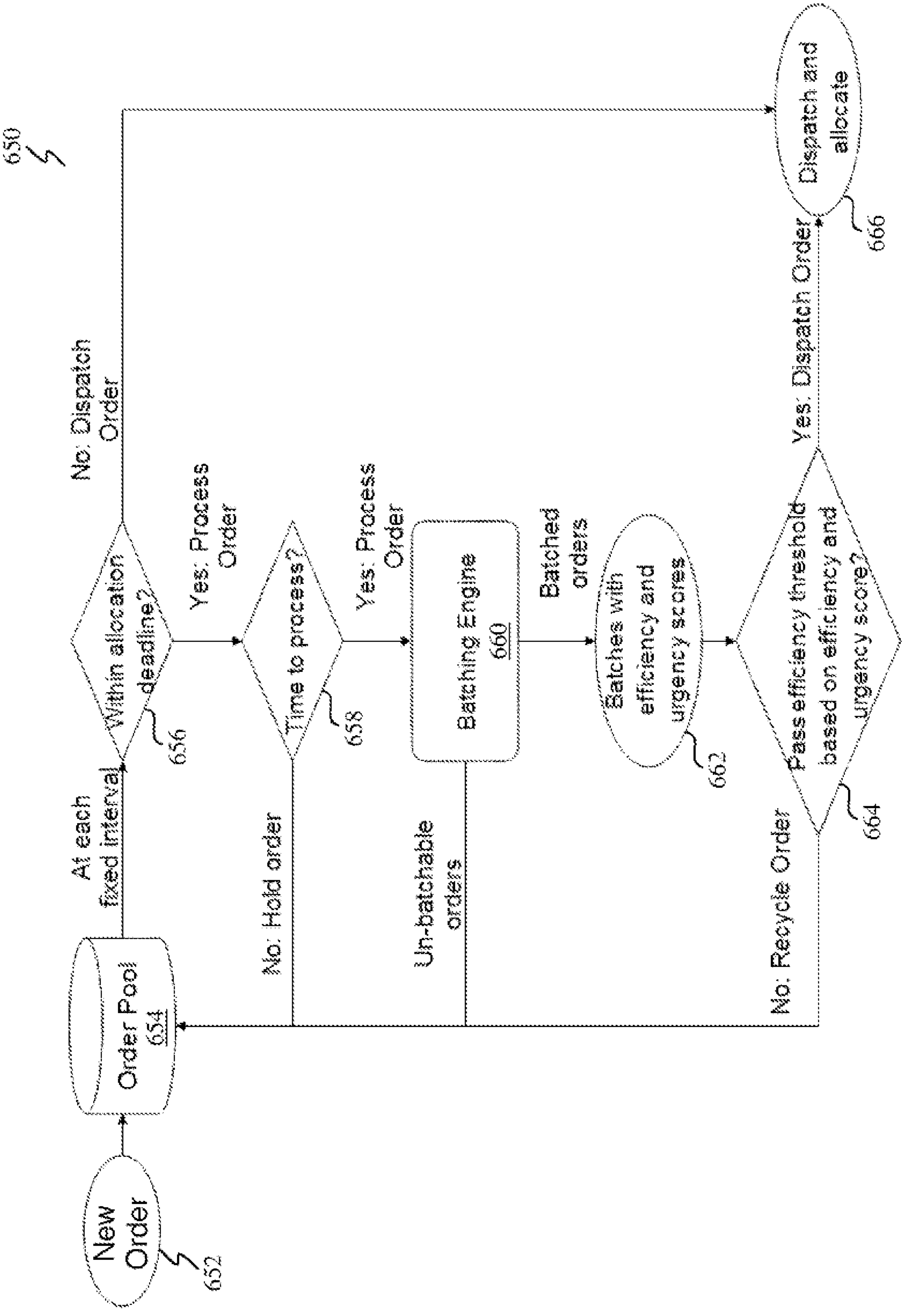
FIG. 6 shows a diagram illustrating an overall flow for a scheduled order batching.
Figure 7:
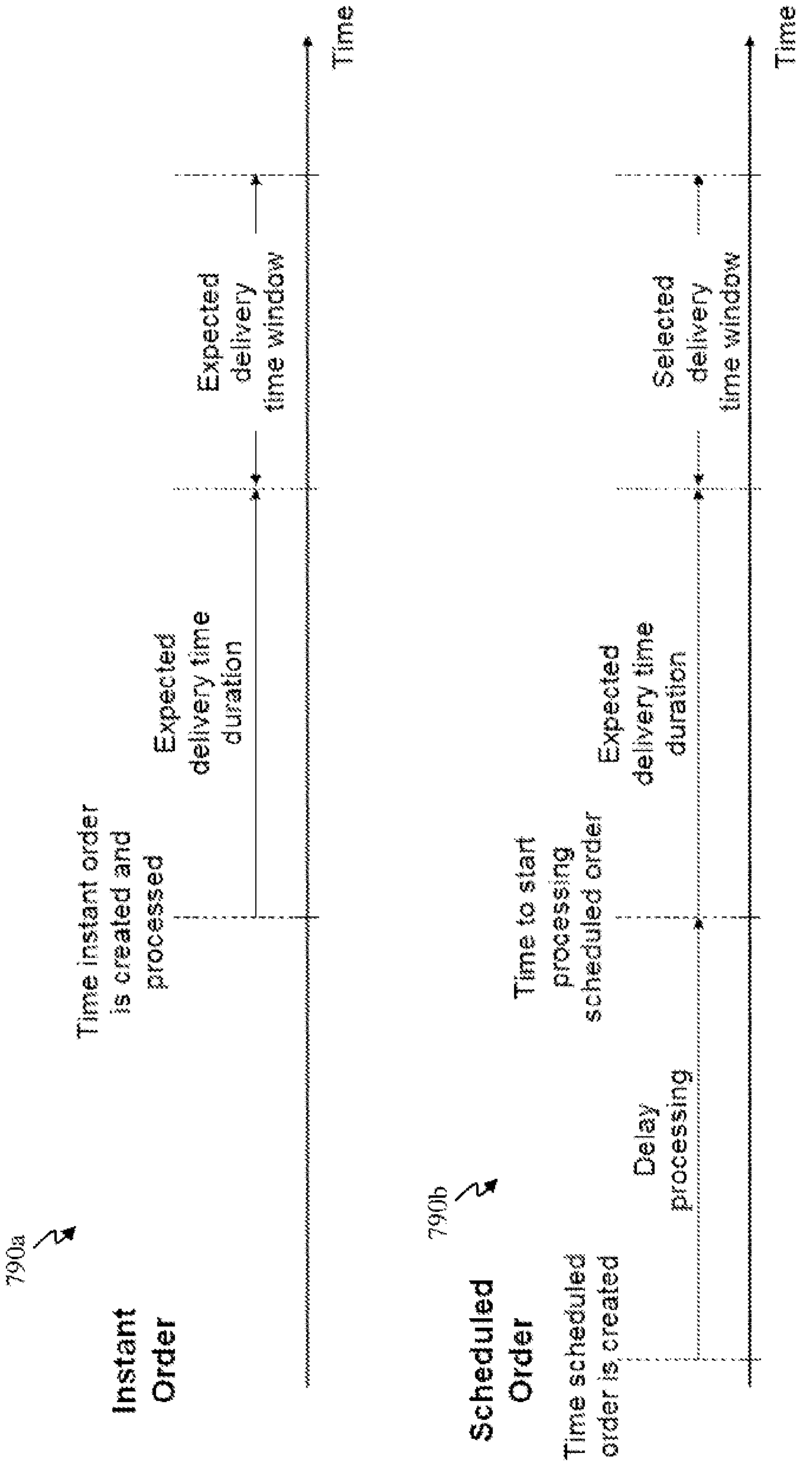
FIG. 7 (PRIOR ART)
FIG. 7 shows diagrams illustrating handling of an instant order and a scheduled order according to the prior art.

The interaction of the batching engine and the order pool (with recycling) enabling the efficient batching of scheduled orders will now be described. The two systems interact dynamically, as illustrated in FIG. 6 showing a diagram of an overall flow of a scheduled order batching, to achieve an efficient batching of scheduled orders which is to be achieved by the techniques disclosed herein.

When a new order 652 comes in, the order 652 is placed into the order pool 654. The order pool 654 collects or contains orders currently pending to be processed. This pool 654 may contain both scheduled and instant orders. At each fixed interval for batching, the process described above is triggered. Orders (e.g., including new order 652) which are still within the allocation window (or before the allocation deadline), e.g., before the deadline as determined at 656 and after time to process as determined at 658, are passed to the batching engine 660 for batching computation. Orders which have passed the allocation deadline, as determined at 656, are sent for dispatch and allocation 666, while orders which have not reached the time to process (or the "time to start processing" described above for balancing between efficient computational resource usage and generation of efficient batches), as determined at 658, are held in the order pool 654 for future consideration (or future batching attempt (s)).

The "time to start processing" may be determined via the method described above using historical data. In situations where the "time to process" is not "immediately after the scheduled order is created" (e.g., at a time after the first/immediate batching cycle that occurs after creation of the scheduled order), then this "time to process" may be determined by looking at historical performance (e.g., in terms of earliness/lateness, efficiencies, and computational resource utilisation) to achieve the desired balance. In contrast, in the prior art, a scheduled order is processed as an instant order at a time that is analogous to the "allocation deadline" since this is the time that the scheduled order is treated as if it is an instant order and still be delivered within the specified delivery time window.

The batching engine 660 may then execute batching calculation on the orders to be processed, generating order batches such that the orders are delivered within their determined time windows (as selected by the consumers for scheduled orders, and the respective delivery time limit for instant orders). Orders which cannot be batched (e.g., unbatchable or unbatched orders) are returned to the order pool 654 for future consideration. "Un-batchable orders" refer to orders which fail to be batched due to one or more requirements such as time window, vehicle type, etc, or simply absence of other order(s) to be suitably batched with. They can potentially be batched with other incoming order(s) eventually.

The batching engine 660 may, at 662, compute the respective urgency and efficiency scores for the batches generated. Within the recycling logic (see 362, FIG. 3), if the order batch passes the efficiency threshold based on the urgency score, as determined at 664, the batch is sent for dispatch and allocation 666. Otherwise, the orders in the batch are recycled back into the order pool 654 for future consideration.

In various embodiments, an allocation system or allocation engine may be provided for the dispatch and allocation at 666. As a non-limiting example, the allocation system carry out one or more of the following: (i) obtaining or determining the availability of one or more delivery agents, (ii) for a delivery agent, determining whether the delivery agent is able to fulfil delivery of the batch within the constraints of delivery limit or window, (iii) allocating or assigning a batch of orders to a delivery agent for delivery of the orders, (iv) providing or transmitting dispatch and advanced notifications relating to orders to merchants and/or delivery agents. The allocation system may be part of or external to the system having the order pool 654 and the batching engine 660.

As described above, the interaction between the batching engine 660 and the order pool 654 may enable "future consideration", where the recycled orders may be considered for future or subsequent batching attempt(s). Orders get a chance to be batched with other orders placed in the past (or in the future) in the order pool 654. This may allow for a larger effective solution space, allowing the batching engine 660 to produce batches of higher efficiencies. At the same time, the allocation deadline and delivery time windows ensure service quality in terms of delivery times to the consumer.

Using the example of the new order 652 as a scheduled order, the scheduled order 652 is processed or considered for batching at or during a batching attempt or cycle. The scheduled order 652 may be processed soon after the scheduled order 652 has been placed or made by a consumer, in advance of the delivery time. If there is successful batching or pooling of the scheduled order 652 together with one or more other orders (which may be scheduled and/or instant order(s)) at or during a batching attempt, for example, into a batch of orders that satisfy the efficiency requirement, the batch containing the scheduled order 652 is released for dispatch and allocation for delivery by a delivery agent, with the scheduled order 652 to be delivered to the consumer who made the scheduled order 652 at the delivery timeframe defined or specified by the consumer. Otherwise, the batch is recycled, and its constituent orders, including the scheduled order 652, are returned to the order pool 654. Therefore, it should be appreciated that, depending on the batching efficiency determined for the order batch containing the scheduled order 652, the batch may or may not be released at a batching cycle. In some instances, the scheduled order 652 may undergo two or more batching cycles before being batched, and released.

In contrast to known approaches where scheduled orders are not considered earlier and are only considered as instant orders after a predetermined processing delay time, for the techniques disclosed herein, scheduled orders are considered earlier as described herein, and potentially alongside other scheduled and/or instant orders. In various embodiments, it may be possible that scheduled orders are released (prepared and dispatched) earlier in a batch with a longer trip to get to the customer. Further, there may be less trips required for the same number of orders. As a non-limiting example, if a scheduled order is batched with an instant order, then dispatching the scheduled order earlier may result in a longer trip (to deliver the instant order first), and less trips are required for the same number of orders.

The techniques disclosed herein may include the provision for dispatch and advanced notification. For each incoming order (scheduled or instant order), the required preparation time may be predicted or determined based on the order information (e.g., quantity and/or items). With this predicted preparation time, it is possible to notify the corresponding merchant to start preparing the order just-in-time for the delivery agent's planned arrival at the merchant's location to collect the order for delivery. For example, the merchant may require preparation time to package the item(s) of the order. For food item(s), the food merchant may additionally need to cook the food.

The provision for dispatch and advanced notification may be helpful, for example, where the batch includes (purely) (or consists of) scheduled orders (for example, in the case of groceries orders). When a good batch is created (as described herein, e.g., meeting the batch efficiency condition or requirement), the predicted preparation time may be checked to determine when the merchant and the delivery agent have to be notified. If the preparation time is long, then the merchant is notified first and the delivery agent is notified later (as the time gets closer to the time when the order is ready for pick up by the delivery agent) so that the delivery agent does not have to wait too long, if at all, at the merchant's location, while still meeting (all) the delivery time window requirements. This is referred to as "delayed allocation" (or "allocation delay" as mentioned above).

The interaction with the allocation system (e.g., an external system), may be determined by computing the "early waiting time" and "slack time" of a batch which contain scheduled orders.

1. Early waiting time is the expected total time that the delivery agent is expected to wait at the merchant's location (e.g., calculated based on the predicted preparation time) if the batch is dispatched immediately. Hence, this is the amount of time for which the allocation to the delivery agent is to be delayed such that the waiting time at the merchant's location is minimised. A similar computation may be done for the lower bound of the delivery time window (i.e., earliest delivery time), if an order cannot be delivered early.
2. Slack time is the time between the upper bound of the delivery time window (i.e., latest delivery time) and the expected delivery time for each order in the batch. The slack time for the entire batch is the minimum slack time of the constituent orders. Hence, this is the maximum amount of time that the allocation to the delivery agent can be delayed such that the delivery time window requirement is met.

By taking the smaller quantity or number of the two time parameters described above, the delayed allocation time may be determined.

It will be appreciated that the invention has been described by way of example only. Various modifications may be made to the techniques described herein without departing from the spirit and scope of the appended claims. The disclosed techniques comprise techniques which may be provided in a stand-alone manner, or in combination with one another. Therefore, features described with respect to one technique may also be presented in combination with another technique.

The invention claimed is:

1. A communications server apparatus for managing orders, comprising a processor and a memory, the communications server apparatus being configured, under control of the processor to execute instructions stored in the memory to:

in response to receiving order data indicative of a scheduled order associated with a user, the order data comprising an item data field indicative of at least one item and a time data field indicative of a delivery time defined by the user for delivery of the scheduled order to the user, and in a batching cycle, generate, in one or more data records:

batch data indicative of an order batch comprising the scheduled order and at least one unbatched order; and quality data indicative of a quality indicator for the order batch, wherein the quality indicator comprises an efficiency indicator and an urgency indicator which are computed iteratively for the order batch; and if a batching efficiency condition is satisfied based on the quality indicator, release data indicative of a release of the order batch for allocation of the order batch to a delivery agent for the scheduled order to be delivered by the delivery agent to the user at the delivery time and if the batching efficiency condition is not satisfied, the scheduled order is subjected to an additional batching cycle, wherein the satisfaction of the batching efficiency condition terminates the iterative computation of the urgency indicator and the efficiency indicator.

2. The communications server apparatus as claimed in claim 1, further configured to generate allocation data indicative of the allocation of the order batch to the delivery agent.

3. The communications server apparatus as claimed in claim 1, wherein, if the batching efficiency condition is not satisfied based on the quality indicator, the communications server apparatus is configured to:

recycle the scheduled order, wherein the scheduled order that is recycled is to be subjected to the additional batching cycle.

4. The communications server apparatus as claimed in claim 1, wherein, for generating the quality data, the communications server apparatus is configured to:

generate first indicator data indicative of the urgency indicator for the order batch, wherein the urgency indicator comprises an urgency score; and generate second indicator data indicative of the efficiency indicator for the order batch, wherein the efficiency indicator comprises an efficiency score.

5. The communications server apparatus as claimed in claim 4, further configured to:

determine, based on the urgency indicator, a set of efficiency parameter thresholds; and compare the efficiency indicator with the efficiency parameter thresholds, wherein the batching efficiency condition is satisfied if the efficiency indicator satisfies the efficiency parameter thresholds.

6. The communications server apparatus as claimed in claim 5, wherein the set of efficiency parameter thresholds are variable depending on the urgency indicator.

7. The communications server apparatus as claimed in claim 1, being further configured to subject the scheduled order to a plurality of batching cycles until the batching efficiency condition is satisfied.

8. The communications server apparatus as claimed in claim 1, wherein the scheduled order is to be fulfilled by a merchant, the communications server apparatus being further configured to:

generate preparation data indicative of a preparation time duration that is required by the merchant to prepare at least one item, the preparation time duration being determined based on the order data received.

9. The communications server apparatus as claimed in claim 8, further configured to:

generate merchant data indicative of order information corresponding to the scheduled order; and transmit the merchant data at a time determined based on the preparation time duration and the delivery time to a communications device associated with the merchant to notify the merchant of the scheduled order for preparation of the at least one item to reduce at least one of an idle time duration of the scheduled order, prior to pick-up by the delivery agent, of the at least one item that is prepared, or a handling time of the scheduled order duration between the pick-up and delivery of the at least one item by the delivery agent.

10. The communications server apparatus as claimed in claim 8, further configured to:

generate agent data indicative of delivery information corresponding to the scheduled order; and transmit the agent data to a communications device associated with the delivery agent at a time determined based on the preparation time duration and the delivery time to notify the delivery agent of a pick-up of the at least one item to reduce at least one of a waiting time duration of the delivery agent at the merchant, or a handling time duration between the pick-up and delivery of the at least one item by the delivery agent.

11. A method for managing orders, the method comprising:

in response to receiving order data indicative of a scheduled order associated with a user, the order data comprising an item data field indicative of at least one item and a time data field indicative of a delivery time defined by the user for delivery of the scheduled order to the user, and in a batching cycle, generating, in one or more data records:

batch data indicative of an order batch comprising the scheduled order and at least one unbatched order; and quality data indicative of a quality indicator for the order batch, wherein the quality indicator comprises an efficiency indicator and an urgency indicator which are computed iteratively for the order batch; and if a batching efficiency condition is satisfied based on the quality indicator, release data indicative of a release of the order batch for allocation of the order batch to a delivery agent for the scheduled order to be delivered by the delivery agent to the user at the delivery time and if the batching efficiency condition is not satisfied, the scheduled order is subjected to an additional batching cycle. wherein the satisfaction of the batching efficiency condition terminates the iterative computation of the urgency indicator and the efficiency indicator.

12. The method as claimed in claim 11, further comprising generating allocation data indicative of the allocation of the order batch to the delivery agent.

13. The method as claimed in claim 11, wherein, if the batching efficiency condition is not satisfied based on the quality indicator, the method comprises: recycling the scheduled order, wherein the scheduled order that is recycled is to be subjected to the additional batching cycle.

14. The method as claimed in claim 11, wherein generating the quality data comprises:

generating first indicator data indicative of the urgency indicator for the order batch, wherein the urgency indicator comprises an urgency score; and generating second indicator data indicative of the efficiency indicator for the order batch, wherein the efficiency indicator comprises an efficiency score.

15. The method as claimed in claim 14, further comprising:

determining, based on the urgency indicator, a set of efficiency parameter thresholds; and comparing the efficiency indicator with the efficiency parameter thresholds, wherein the batching efficiency condition is satisfied if the efficiency indicator satisfies the efficiency parameter thresholds.

16. The method as claimed in claim 15, wherein the set of efficiency parameter thresholds are variable depending on the urgency indicator.

17. The method as claimed in claim 11, further comprising subjecting the scheduled order to a plurality of batching cycles until the batching efficiency condition is satisfied.

18. The method as claimed in claim 11, wherein the scheduled order is to be fulfilled by a merchant, the method further comprising:

generating preparation data indicative of a preparation time duration that is required by the merchant to prepare at least one item, the preparation time duration being determined based on the order data received.

19. The method as claimed in claim 18, further comprising:

generating merchant data indicative of order information corresponding to the scheduled order; and transmitting the merchant data at a time determined based on the preparation time duration and the delivery time to a communications device associated with the merchant to notify the merchant of the scheduled order for preparation of the at least one item to reduce at least one of an idle time duration of the scheduled order, prior to pick-up by the delivery agent, of the at least one item that is prepared, or a handling time duration of the scheduled order between the pick-up and delivery of the at least one item by the delivery agent.

20. The method as claimed in claim 18, further comprising:

generating agent data indicative of delivery information corresponding to the scheduled order; and transmitting the agent data to a communications device associated with the delivery agent at a time determined based on the preparation time duration and the delivery time to notify the delivery agent of a pick-up of the at least one item to reduce at least one of a waiting time duration of the delivery agent at the merchant, or a handling time duration between the pick-up and delivery of the at least one item by the delivery agent.

21. A computer program or a computer program product comprising instructions for implementing the method as claimed in claim 11.

22. A non-transitory storage medium storing instructions, which when executed by a processor cause the processor to perform the method as claimed in claim 11.

* * * * *